US007766489B2

(12) United States Patent
Duine et al.

(10) Patent No.: US 7,766,489 B2
(45) Date of Patent: Aug. 3, 2010

(54) DEVICE FOR PROJECTING A PIXELATED LIGHTING PATTERN

(75) Inventors: Peter Alexander Duine, Eindhoven (NL); Hugo Johan Cornelissen, Eindhoven (NL); Helmut Zahn, Eindhoven (NL); Marten Sikkens, Eindhoven (NL); Jorrit Ernst De Vries, Eindhoven (NL); Remco Alphonsus Hendrikus Breen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 254 days.

(21) Appl. No.: 11/915,303

(22) PCT Filed: May 10, 2006

(86) PCT No.: PCT/IB2006/051472

§ 371 (c)(1), (2), (4) Date: Nov. 21, 2007

(87) PCT Pub. No.: WO2006/126122

PCT Pub. Date: Nov. 30, 2006

(65) Prior Publication Data

US 2008/0192209 A1 Aug. 14, 2008

(30) Foreign Application Priority Data

May 25, 2005 (EP) ................................ 05104439

(51) Int. Cl.
*G03B 21/20* (2006.01)

(52) U.S. Cl. ............................ 353/85; 353/86; 353/87; 353/89; 353/48; 353/119; 362/227; 362/237; 362/241; 362/600; 362/601; 313/512; 313/505; 313/500

(58) Field of Classification Search .................. 353/86, 353/87, 89, 48, 119, 85, 122; 362/227, 237, 362/241, 231, 184, 185, 208, 183, 800, 234, 362/600, 601, 602, 603, 605, 611, 612, 613, 362/296.1; 313/512, 505, 500

See application file for complete search history.

(56) References Cited

U.S. PATENT DOCUMENTS

| | | | | |
|---|---|---|---|---|
| 6,375,340 | B1 * | 4/2002 | Biebl et al. | 362/294 |
| 6,488,390 | B1 * | 12/2002 | Lebens et al. | 362/231 |
| 6,650,048 | B2 * | 11/2003 | Wu | 313/512 |
| 6,764,196 | B2 | 7/2004 | Bailey | |
| 2003/0156425 | A1 | 8/2003 | Turnbull | |
| 2004/0160199 | A1 | 8/2004 | Morgan | |
| 2007/0085084 | A1 * | 4/2007 | Erchak et al. | 257/79 |

FOREIGN PATENT DOCUMENTS

| | | |
|---|---|---|
| JP | 2000140193 | 5/2000 |
| JP | 2002374004 | 12/2002 |
| JP | 2004305606 | 11/2004 |
| WO | 9534014 | 12/1995 |
| WO | 2004094896 | 11/2004 |

* cited by examiner

*Primary Examiner*—Georgia Y Epps
*Assistant Examiner*—Sultan Chowdhury

(57) ABSTRACT

A lighting device is provided for projecting a pixelated lighting pattern to be viewed onto a surface facing said device is provided. The device comprises a plurality of independently controllable lighting units (1), each lighting unit comprising at least one light-emitting diode (3, 4, 5, 6), and a controller (7) for controlling the emission of light from said lighting units. A device according to the present invention allows ambient illumination of a surface and projection of images and patterns.

8 Claims, 2 Drawing Sheets

DEVICE FOR PROJECTING A PIXELATED LIGHTING PATTERN

FIELD OF INVENTION

Figure 1:
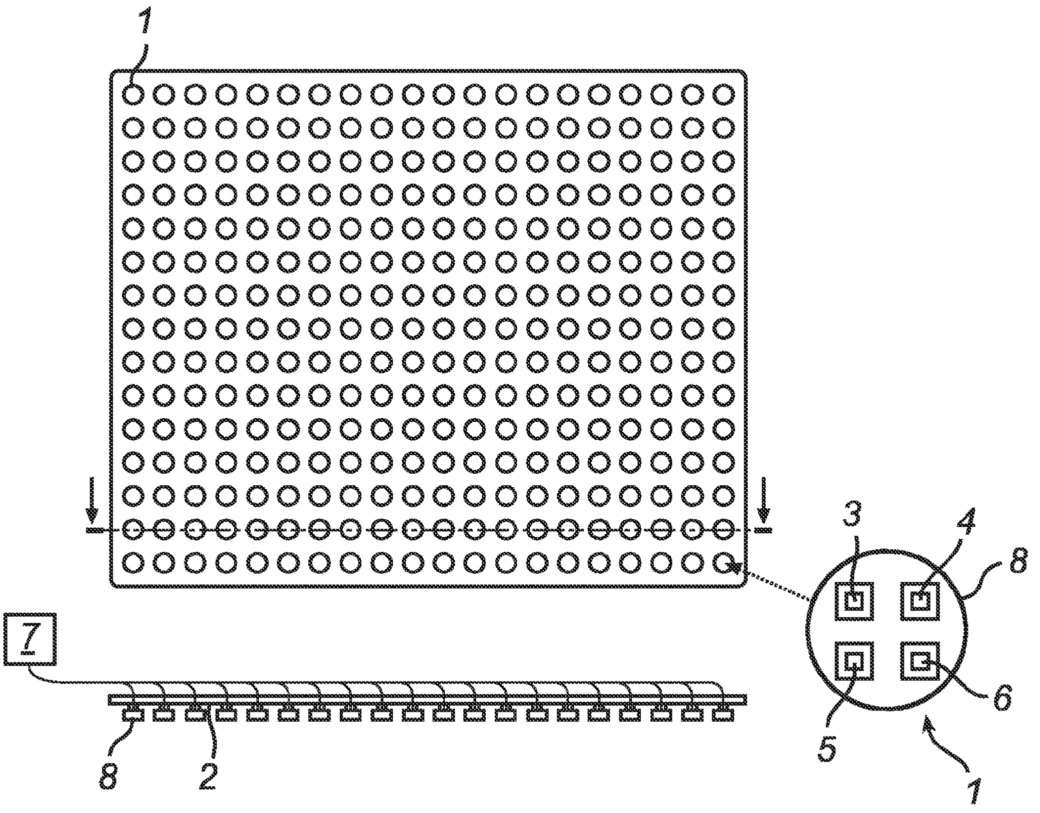

The present invention relates to a lighting device for projecting a pixelated lighting pattern to be viewed onto a surface facing said device, comprising a plurality of lighting units, each lighting unit comprising at least one light-emitting diode, and a controller for controlling the emission of light from said lighting units.

BACKGROUND OF INVENTION

Lighting devices based on light-emitting diodes are currently contemplated for indoor illumination, such as for example in offices, homes, stores, automobiles and airplanes, etc.

Conventionally, fluorescent tubes and incandescent lamps have been used as light sources for such lighting devices.

Lately, light-emitting diodes (LEDs) have been proposed as light sources for this type of lighting devices. Light-emitting diode based lighting devices are attractive since the life time of a light-emitting diode typically is much longer than the lifetime of fluorescent tubes and incandescent bulbs. Furthermore, light-emitting diodes are less power consuming than incandescent bulbs, and are expected to become more efficient than fluorescent tubes in the future.

The development of high-power LEDs, providing light-emitting diodes emitting very high intensity light, intensifies this progress.

One example of a LED-based overhead lighting system is described in U.S. Pat. No. 6,764,196 to Bailey, which features a ceiling panel with a plurality of embedded ultra bright LEDs to illuminate a room. However, the lighting system described in U.S. Pat. No. 6,764,196 is not suited for displaying visually distinct information on the illuminated surface.

For projecting visually distinct, user interactive information, such as alphanumerical signs, images, patterns and video sequences, conventional data projectors are suitable.

However, conventional data projectors are typically based on a constantly operating high intensity discharge bulb and a programmable filter for switching individual pixels on or off. Thus, conventional data projectors would be very power consuming devices for indoor illumination.

Thus, there is a need for a lighting device that has low power consumption and which may be used both for ambient illumination and information projection.

SUMMARY OF THE INVENTION

One object of the present invention is to overcome these problems and to provide a lighting source that is suitable for both ambient illumination and information projection.

Thus, in one aspect the present invention provides a lighting device for projecting a pixelated lighting pattern to be viewed onto a surface facing said device, comprising a plurality of lighting units, each lighting unit comprising at least one light-emitting diode, and a controller for controlling the emission of light from the lighting units. In the lighting device of the present invention, the lighting units are independently controllable by the controller and each light-emitting diode is responsible for a limited pattern area portion.

A pixelated lighting pattern may be projected onto a surface by using an array of lighting units, where each lighting unit is responsible for a limited area of the projected pattern. This allows the use of light-emitting diodes as light sources.

Meanwhile, the lighting device may be used also for homogenous illumination of a surface.

In embodiments of the present invention, lighting units may comprise at least a first independently controllable light-emitting diode of a first color and a second independently controllable light-emitting diode of a second color.

By using several independently controllable LEDs of different colors, for example a red, a green and a blue diode as one lighting unit, the color of the light may easily be controlled to provide a color-variable lighting device.

In embodiments of the present invention, the light-emitting diodes may be arranged to emit light at a collimation angle of less than about 20°, or less than about 10°, for example less than 5°. Preferably the device comprises a collimating means arranged to receive light emitted by each of the lighting units and to collimate and project at least part of the received light as a separate light beam for each of the lighting units.

A narrow collimation of the light emitted by each lighting unit allows the lighting device to be arranged at some distance from the surface to be illuminated, for example in the range of about 0.1 to 5 m, still maintaining the possibility to project desired patterns. Some overlap of the pattern area portions ("pixels") from adjacent lighting units may in some applications be necessary to obtain a homogenous illumination and/or smooth transitions between adjacent pattern area portions. However, if the overlap is too big, the possibility to project a desired image on a surface is limited to images having a very low contrast.

The distance between two adjacent lighting units in a lighting device of the present invention may be larger than about 1 mm, or larger than about 1 cm, for example larger than about 10 cm or even larger. This allows a limited number of lighting units to illuminate a surface.

The distance and the collimation angle will typically be adjusted to obtain the desired image contrast for a certain distance between the device and the surface onto which the pattern is to be projected.

In embodiments of the present invention, the controller may be capable of receiving data representing a pixelated pattern and of controlling the lighting units to project the pattern onto a surface in the beam path of the lighting device. By adapting the data that represents the pattern, any lighting pattern may be projected onto a surface.

The data representing a pixelated pattern may be comprised in data representing a video sequence. By updating the projected pattern at high frequency, a video sequence may be projected onto a surface.

A lighting device of the present invention may comprise or be connectable to a data provider for providing the controller with data representing a pixelated pattern. The data provider may comprise a sensor and a processing unit, while the processing unit is arranged to receive data from the sensor and to process the data from the sensor into data representing a pattern.

The sensor may for example be motion detectors, temperature sensors, cameras, photo-sensors, microphones, etc.

In embodiments of the present invention, the lighting units are arranged on a first side of a support having a first and an opposing second side, wherein the support comprises ventilation openings from the first to the second side.

High-power LEDs dissipate a lot of heat when in operation. Openings in the support for ventilation may provide a longer useful life of the device.

These and other aspects of the present invention will now be described in more detail, with reference to the appended drawings, showing a currently preferred embodiment of the invention.

FIG. 1 schematically illustrates a currently preferred embodiment of a lighting unit of the present invention.

Figure 2A:
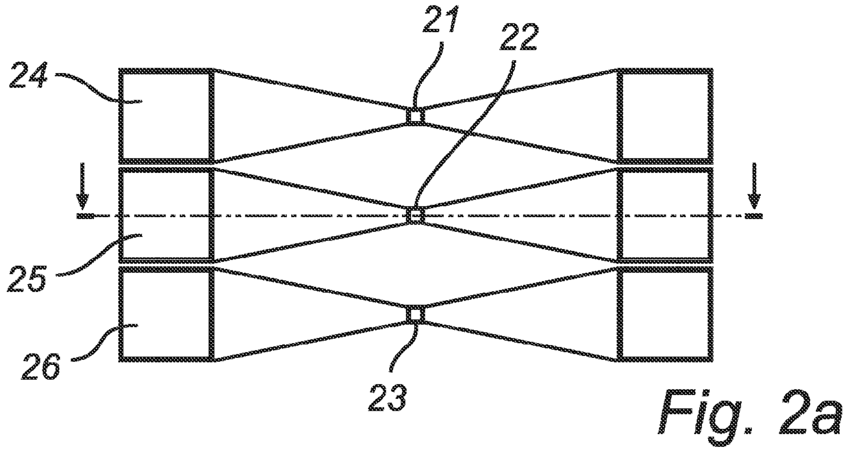
Figure 2B:
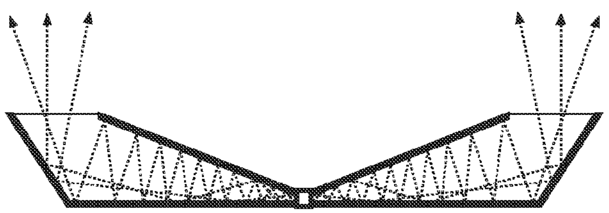
Figure 3:
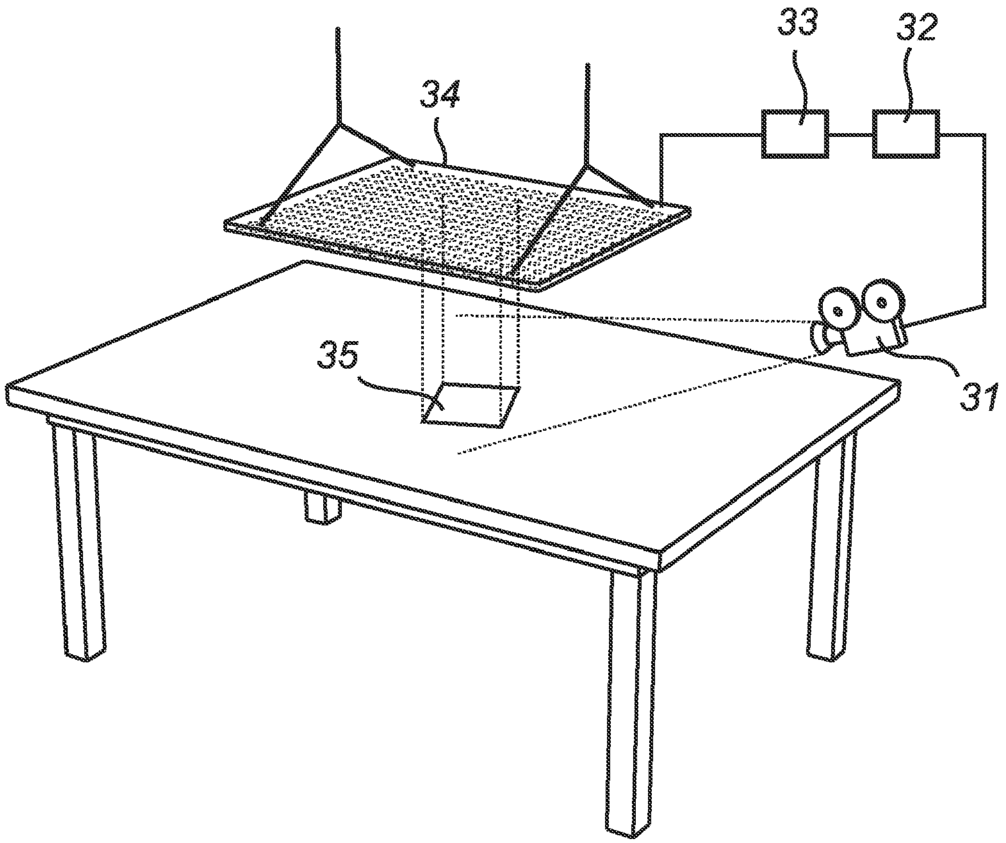

FIG. 2*a* illustrates a top view of the detail of an embodiment of the present invention;

FIG. 2*b* illustrates a side view of the detail of an embodiment of the present invention;

FIG. 3 schematically illustrates a setup according to an embodiment of the present invention.

DETAILED DESCRIPTION OF THE INVENTION

An embodiment by way of example of the present invention, as is depicted in FIG. 1, comprises a rectangular 20×16 matrix of color and intensity variable lighting units 1 arranged on an essentially rectangular panel 2 of size 2×1.6 m. The lighting units are arranged in a rectangular grid with a pitch of 10 cm.

Each lighting unit comprises a set of four light-emitting diodes, a red diode 3, a blue diode 4, a green diode 5 and a white diode 6.

Each of the diodes is connected to a LED-controller 7 which is capable of independently controlling the intensity of light emitted by each of the LEDs in each of the separate lighting units 1.

A collimator 8 is arranged on light-emitting diodes 3, 4, 5, 6 in order to collimate the light from each of the light-emitting diodes to a narrow light beam having a collimation angle of approximately 8°.

The collimators are arranged to project the light essentially in the median direction of the normal to the surface of the panel.

As the light beams from each lighting unit 1 are narrowly collimated and directed parallel to a direction away from the panel, different light beams from different lighting units 1 illuminate different, limited areas, "pixels", of a surface which is illuminated by the lighting device.

This allows a lighting pattern with the resolution of 20×16 pixels (the same resolution as the number of lighting units) to be projected onto a surface placed in the beam path of the device, for illumination of the surface. Thus, each lighting unit is responsible for a limited pattern area portion.

As used herein, "a projected lighting pattern" and related terms refer to a field of light being projected onto and illuminating a surface by a device of the invention. The projected pattern may be a single point or single discrete points of light, a homogenous field of light, such as an essentially uniform white or colored field, a pattern representing any information, such as text or an image, or an abstract pattern.

A projected lighting pattern may represent a single frame in a video sequence and by updating the projected pattern at a high frequency the impression of a moving image, such as a video sequence, may be projected onto the surface.

Each lighting unit is responsible for illuminating a limited portion of the pattern area. Thus, the projected lighting pattern is to be referred to as a "pixelated pattern", where each lighting unit is responsible for one pixel of the pattern. However, in certain cases, adjacent pixels, i.e. adjacent pattern area portions, may at least partly overlap in order to provide a smooth transition between adjacent pixels of the pattern.

In the setup of the above embodiment, the areas (pixels) illuminated by adjacent lighting units partly overlap when the distance form the device to the surface is around 1 to 1.20 m. This results in individually controllable pixels, which gives a smooth transition between the pixels. Thus, the impression of a homogenously illuminated surface is provided if all lighting units are operating at the same color and intensity. Furthermore, if adjacent lighting units operate at different intensity and/or color, a smooth intensity/color transition between the adjacent pixels of the projected pattern is provided.

In addition, if the intensity of one pixel is transferred to the neighboring pixel using an interpolation algorithm (such that the intensity moves gradually from one to the other), the perceived resolution is much higher to the observer than can be expected by the pixel pitch.

In the operating mode, the different light beams from the light-emitting diodes 3, 4, 5, 6 of a lighting unit 1 illuminate essentially the same area. By varying the intensity of the different diodes of one unit, light beams of varying colors will illuminate this area, forming a variable-color light source.

The controller 7 controls the color and/or intensity of light emitted by each of the lighting units 1 by controlling each of the light-emitting diodes in each lighting unit.

The lighting units may comprise one or more light-emitting diodes. A typical variable-color lighting unit comprises at least two light-emitting diodes of different colors, typically a red, a green and a blue light-emitting diode and optionally a white light-emitting diode. The differently colored LEDs in a variable-color lighting unit are independently controllable in intensity. As the light beams from each of the diodes illuminate essentially the same area on an illuminated surface, the different colors mix to provide a variable color. Monochrome lighting units typically comprise one or more light-emitting diodes of the same color.

As used herein, the color of a light-emitting diode, such as a blue or red light-emitting diode, refers to the perceived color of the light emitted by the light-emitting diode.

Light-emitting diodes, as used herein, include all types of light-emitting diodes, including conventional inorganic based LEDs, organic based LEDs (OLEDs) and polymeric based LEDs (polyLEDs). The light-emitting diodes referred to herein are capable of emitting light of any color in the range from ultraviolet to infrared, as well as light-emitting diodes provided with a luminescent color-converting compound in order to provide light of a certain color. For example, white light LEDs may be provided by using a blue light LED and a yellow emitting compound, where the color converted yellow light and unconverted blue light mix into an essentially white light. In addition, light-emitting diodes also include laser diodes, i.e. light-emitting diodes emitting laser light.

Light-emitting diodes that may be used in a lighting device of the present application include, but are not limited to, light-emitting diodes classified as high-brightness or high-intensity light-emitting diodes.

In embodiments of the invention, the lighting units may be provided with collimators. Such collimators are arranged to receive light emitted by the LEDs and to project the received light as a collimated light beam.

As used herein, the term "collimation angle" is determined as two times the angle between the center of the light cone and the point of half the maximum beam intensity.

Typically, the desired collimation angle is smaller than 20°, or smaller than 10°, for example smaller than 5°.

However, a suitable collimation angle for a device of the present invention will depend on the pitch of the light unit matrix, i.e. the distance between adjacent lighting units, and on the distance from the lighting unit to the surface to be illuminated.

The larger the distance, the smaller the collimation angle will have to be in order to reduce blur and increase the contrast which can be created between two adjacent pixels. A suitable collimation angle given this information will readily be derivable for those skilled in the art.

A large collimation angle gives more blur and lower contrast and requires the lighting source to be located at a very short distance from the surface on which an image is to be projected, or adjacent lighting units to be arranged at a large distance from each other.

In embodiments of the present invention, each light-emitting diode is provided with a separate collimator to collimate the light emitted by that light-emitting diode.

As will be realized by those skilled in the art, several different types of collimators may be used to achieve the desired collimating and projecting effect.

In embodiments of the present invention, it may be advantageous to use collimators having a low profile, "flat collimators". One example of a lighting unit setup with such flat collimators is shown in FIGS. 2*a* and 2*b*, wherein a red LED 21, a green LED 22 and a blue LED 23, are each provided with a separate collimator 24, 25 and 26, respectively.

The LED controller 7 is preferably a LED controller that is capable of independently controlling the intensity of light emitted by each LED in the lighting device. It may alternatively comprise a network of two or more cooperating LED controllers, each controlling a sub-portion of the LEDs in the device, however together acting as one LED-controller.

The LED-controller may control the individual LEDs by different methods of addressing, such as, but not limited to active and passive matrix addressing, as will be apparent to those skilled in the art.

In embodiments of the present invention, the LED controller is capable of receiving data representing a pattern and processing this data into individual control signals for each of the LEDs of the device, in order to project this pattern on a surface in the beam path of the device.

The pattern data may advantageously represent a pixelated image of the same resolution as the resolution of the array of lighting units, wherein each pixel in the received image represents the color and/intensity of the light to be emitted by the corresponding lighting unit.

In embodiments of the invention, the data representing a pattern is an image frame comprised in a video sequence. The on-off response time for a LED is very short, and thus the pattern projected by the lighting device may be updated several times per second, comparable to a conventional data projector, in order to project a video sequence on the illuminated surface.

In embodiments of the present invention, the lighting device is provided with or connected to a data provider, which provides the controller with data representing the pattern to be projected onto a surface.

Several such data providers are deemed to be suitable for use in the present invention, including providers of predetermined images, patterns or video sequences, as well as interactive data providers, such as providers comprising different types of sensors.

Examples of sensors include, but are not limited to, motion detectors, temperature sensors, cameras, photo-sensors, microphones etc, where the response from the sensor to a change in the sensed property leads to a change in the light pattern emitted by the lighting device.

In one example, as schematically shown in FIG. 3, a camera 31 is connected to an image-processing unit 32, which in turn is connected to the LED-controller 33 controlling a lighting device 34.

The camera 31 continuously feeds the image-processing unit 32 with pictures of the area in the beam path of the lighting device 34. The image captured by the camera is analyzed by the image-processing unit. Based on the data extracted from the image, or from a sequence of images, the pattern displayed is adapted and a predefined pattern or sequence of patterns is generated.

In one example, the image processor 32 may detect the presence of a certain object 35 in the beam path. This triggers the image processor 32 to send data to the controller 33 representing a lighting pattern such that the object 35 is highlighted when this lighting pattern is projected by the lighting device 34 to illuminate the surface on which the object 35 is located.

One example of such an application is a lighting device of the present invention arranged over a conference table for illumination thereof. When a paper is placed on a certain area of the table, the camera and the image processing unit detects the presence and location of the paper, and sends data to the LED controller in order to highlight the area of the conference table where the paper is located.

The image processor may also be able to detect a movement and adapt the lighting pattern from the lighting device to this movement.

In another example, the image-processing unit is adapted to recognize different objects and feed the controller with different data depending on the object being recognized.

In one example, when the presence of a hockey puck is detected on a surface, the lighting source will try to follow the movement of the puck with a beam of light.

In another example, an object of a specific shape is detected in the beam path of the lighting device, such as a cube, and this will cause the lighting device to change behavior depending on the pose of the cube.

In yet another example, the orientation and/or location of a rod located on a surface is detected, and the color of the projected lighting pattern changes depending on the orientation and/or location of the rod.

In yet another example, the mood of a person is detected, for example by image analysis of the facial expression, voice analysis, or by measuring the heart pulse rate, etc, and the pattern is adapted on basis of the result. A happy face may turn the light yellow, enhancing the mood as expressed on the face, whereas a sad face turns it blue or starts a bright and sparkling lighting script to improve the mood as expressed on the face.

Typically, the lighting device of the present invention comprises lighting units arranged on a substrate or a panel of any kind.

In embodiments of the present invention, the light units are arranged on an essentially flat panel to emit light in parallel, in a direction essentially along the normal to the surface of the substrate, to illuminate an area in the same order of size as the lighting device.

In other embodiments of the present invention, the light units are arranged to emit light, so that the total emission of light from the lighting device forms a diverging bundle, thus illuminating an area essentially larger than the area of the lighting device. In one example, the lighting units are arranged in a matrix on a convex panel, each specific lighting unit being arranged to emit light in a direction parallel to the normal of the surface of the panel at the location of the specific lighting unit.

The lighting device of the present invention may typically be designed to be arranged in, or hang from, the ceiling and illuminating a surface located beneath or above it. However, it may also be designed to be arranged on a wall and/or illuminating it or any other surface/object.

Typically, the device of the invention may be used in an indoor environment, such as in a store, an office or a vehicle, such as a bus, car, airplane or train. However, other areas of use will be apparent to those skilled in the art.

The person skilled in the art realizes that the present invention is by no means limited to the preferred embodiments described above. On the contrary, many modifications and variations are possible within the scope of the appended claims. For example, high-intensity light-emitting diodes dissipate a lot of heat when in active state. Thus, it may be advantageous to provide good ventilation of a lighting device of the present invention. Thus, in embodiments of the present invention, the lighting device may have openings at the front of the substrate, which faces the illuminated surface, to the back of the substrate, to provide ventilation. Alternatively, the lighting device may comprise a plurality of separate substrates spaced apart, such as for example one substrate per row or column of lighting units, in order to allow ventilation of the device.

In the above-mentioned embodiment, the area capable of being illuminated by the lighting device is an essentially rectangular field. However, as will be apparent to those skilled in the art, other shapes of fields, such as for example essentially circular, elliptical or triangular shapes of fields are obtainable.

The invention claimed is:

1. A lighting device for projecting a pixelated lighting pattern to be viewed onto a surface facing said device, comprising:

a plurality of lighting units, each lighting unit having at least one light-emitting diode, and a controller for controlling the emission of light from said lighting units, wherein said lighting units being independently controllable by said controller and each light-emitting diode being responsible for a limited pattern area portion illumination;

wherein said lighting units have at least a first independently controllable light-emitting diode of a first color and a second independently controllable light-emitting diode of a second color;

wherein said light-emitting diodes are arranged to emit light at a collimation angle of less than about 20°;

wherein each light-emitting diode of said lighting units has a separate collimator arranged to receive light emitted by each of said light-emitting diodes and to collimate and project at least part of said received light as a separate light beam;

wherein each of said collimators is a low profile collimator having a light exit aperture on opposing first and a second sides of said light-emitting diode, said collimator for each of said light-emitting diodes being a substantially flat collimator.

2. A lighting device according to claim 1, wherein the distance between two adjacent lighting units is larger than 1 mm.

3. A lighting device according to claim 1, wherein said controller is capable of receiving data representing a pixelated lighting pattern and to control said lighting units to project said pattern onto said surface.

4. A lighting device according to claim 3, wherein said data representing a pixelated lighting pattern is comprised in data representing a video sequence.

5. A lighting device according to claim 3, comprising a data provider for providing said controller with said data representing a pixelated lighting pattern.

6. A lighting device according to claim 5, wherein said data provider comprises a sensor and a processing unit, said processing unit being arranged to receive data from said sensor and to process said received data into data representing a pixelated lighting pattern.

7. A blighting device according to claim 5, wherein said data provider is selected from the group consisting of cameras, photo-sensors, temperature sensors, movement sensors and microphones.

8. A lighting device according to claim 1, wherein said lighting units are arranged on a first side of a support having a first and an opposing second side, said support comprising ventilation openings from said first to said second side.

* * * * *